2 Sheets—Sheet 1.
S. A. BEMIS,
Assignor of part interest to F. P. REED and A. K. HACKETT.
CAR AXLE BOX.
No. 9,925. Reissued Nov. 15, 1881.
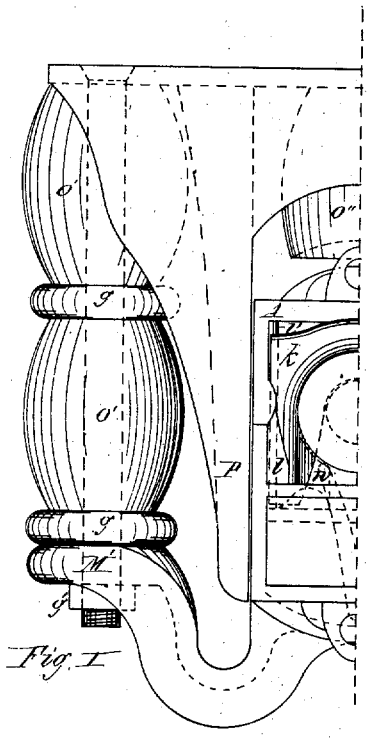
Fig. I
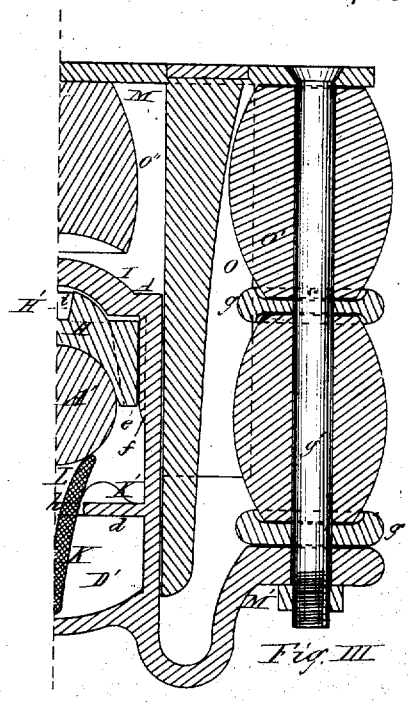
Fig. III
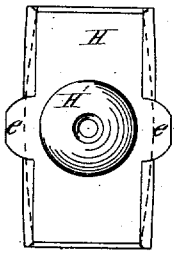
Fig. IV
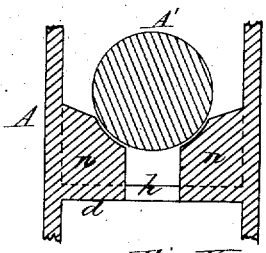
Fig. V
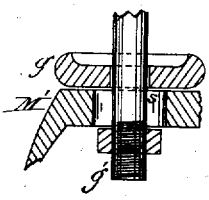
Fig. VI
Witnesses.
Chas. H. Wood.
W. D. Taylor.
Inventor
Sumner A. Bemis
By T. A. Curtis.
his Attys.

2 Sheets—Sheet 2.
S. A. BEMIS,
Assignor of part interest to F. P. REED and A. K. HACKETT.
CAR AXLE BOX.
No. 9,925. Reissued Nov. 15, 1881.
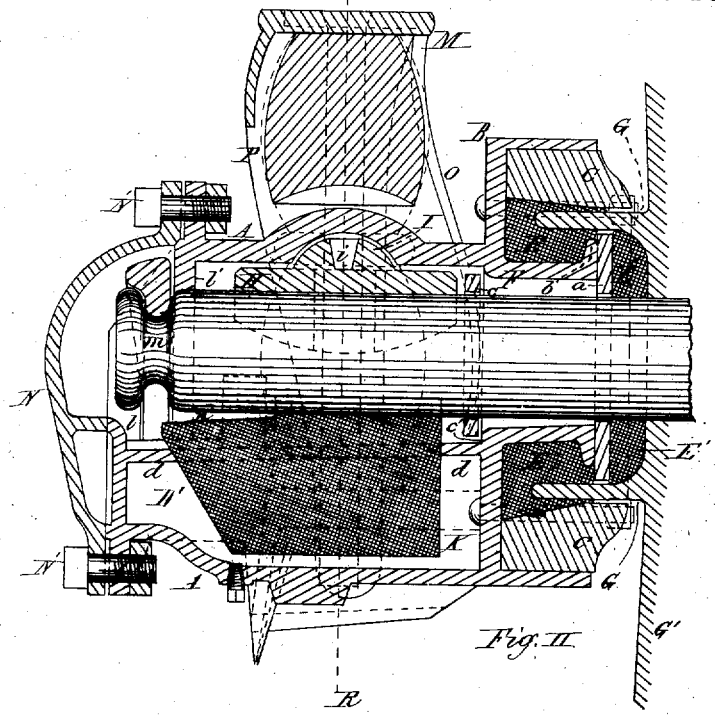
Fig. II.
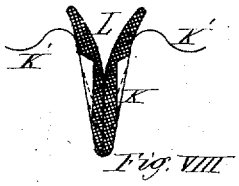
Fig. VIII
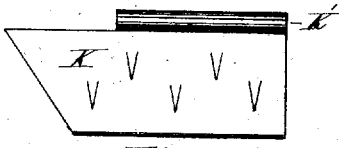
Fig. VII
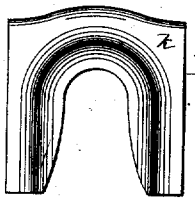
Fig. IX
Witnesses.
Chas. H. Wood.
W. D. Taylor.
Inventor.
Sumner A. Bemis
By T. A. Curtis,
his atty.

UNITED STATES PATENT OFFICE.

SUMNER A. BEMIS, OF SPRINGFIELD, MASS., ASSIGNOR OF PART INTEREST TO FREDERICK P. REED AND A. K. HACKETT, OF NEW YORK, N. Y.

CAR-AXLE BOX.

SPECIFICATION forming part of Reissued Letters Patent No. 9,925, dated November 15, 1881.

Original No. 194,801, dated September 4, 1877. Application for reissue filed August 26, 1881.

*To all whom it may concern:*

Be it known that I, SUMNER A. BEMIS, of Springfield, county of Hampden, in the State of Massachusetts, have invented a new and useful Improved Journal-Box for Railway-Car Axles; and I do hereby declare that the following is a full, clear, and exact description thereof, reference being had to the accompanying drawings, making a part of this specification, and to the letters of reference marked thereon.

My invention relates to the axle-box in which the axle-journal has its bearing; and it consists of an adjustable brass, arranged to adjust itself to the movements of the axle, while the box is also arranged to hold the brass firmly in its proper position and yet allow it to move with the axle. The box is also provided with lugs below the axle, which operate to hold the latter in its proper relative position within the box.

It also consists of a projecting sleeve made upon the inner end of the box, with a metallic housing also made upon the inner end of the box, outside of and surrounding the sleeve, and extending inward in the same direction with said sleeve, the space outside of the sleeve and within the housing surrounding it being adapted to contain a wood blocking and suitable packing, and to receive an annular flange cast on the car-wheel, said flange being inclosed and protected by the housing. A washer is placed against the end of the sleeve, where it is held by suitable packing placed between it and the car-wheel, and a washer is also placed against a shoulder at the opposite end of the sleeve and between it and the axle-bearing. The axle is held securely within the box by a forked key fitting into an annular recess at the outer end of the axle, and also into a vertical recess within the box near its outer end, all which will be more fully hereinafter described.

Figure I is a half end view of the box with its end cover removed, showing the axle and key and the position of the box in its jaws when attached to a car. Fig. II is a longitudinal vertical section through the box and its attachments at the axis of the axle. Fig. III is a transverse vertical section at the line R of Fig. II. Fig. IV is a plan view of the adjustable journal-bearing. Fig. V is a transverse vertical section of the box through the lugs which assist in holding the axle in place. Fig. VI is a vertical section through the step, showing the elongated hole for allowing side movement of the car and springs. Fig. VII is a side view of the holder for distributing the oil to the axle. Fig. VIII is an end view of the same with the material placed therein, and Fig. IX is a front view of the key.

In the drawings, A represents the box, which is of general rectangular shape and adapted to contain the journal and its bearings, and having a sleeve, as F, made on its inner end, extending inward toward the car-wheel G, and outside of this sleeve is a housing, as B, also made on the inner end of the box, and also extending inward in a direction parallel with the sleeve. This housing is adapted to contain suitable wood blocking, as C, which is secured therein by means of suitable bolts, and the annular flange, as G, cast on the side of the car-wheel G′ projects into the housing between the wood blocking and the sleeve F when in use.

A washer, as *a*, is placed upon the car-axle A′, and against the end of the sleeve F, and is held firmly in that position by any suitable packing material placed between the washer and the car-wheel, similar packing being placed around the sleeve and opposite side of the washer, and also around the end of the flange G, which projects into the housing. It will thus be seen that as the axle between the bearing and the car-wheel is inclosed by the sleeve F, and the latter is inclosed by the flange G on the car-wheel, and said flange is inclosed by the housing, the journal-bearing within the box is most effectually protected from the entrance of dust and dirt at the inner end of the box, and the dust would be compelled to take a very circuitous route to reach the bearing by entering between the car-wheel and the box, even if there were no protection of packing.

The box A is provided with a recessed part, I, on its upper side, which is made concave on its lower side; and H represents the brass made upon its lower side, of a form to fit the upper half of the axle A′, and provided upon its upper side with a spherical protuberance of such convex form as to fit the convex recess I. This brass is provided with an ear, *e*, on each side, which bears against the inside of the box A, or against a rib, *f*, therein, so that when the brass is inserted in place it may fill the width of the box and keep its proper position, and a washer, *c*, is placed upon the axle and against a shoulder, *c'*, in the box, between the brass H and the sleeve F.

The box A is provided with a horizontal partition or web, *d*, extending from one end of the box to the other inside, and this partition is provided with a longitudinal opening, *h*, (shown clearly in Figs. III and V,) forming a space, D', beneath this partition in the box, which serves as the oil-reservoir, and which is filled, or partially filled, with oil when the device is in use. A spring-holder, made somewhat in the form of a letter V, with an ear, K, bent outward on each side, as shown in Figs. VII and VIII, and containing any material, L, which will readily absorb oil, is inserted into the opening *h*, and extends nearly to the bottom of the reservoir D', the ear K extending out each side and resting upon the partition *d*, as shown in Figs. I and III, the oil-conductor or material L extending up and bearing against the axle A', as shown in Fig. III.

The box A has lugs *n* cast on the inside and projecting partially beneath the axle A', as shown in Figs. I and V, which prevents the axle from having too much vertical movement in the box, or the box from tilting upward at the outer end whenever the wheel strikes an obstruction upon the track.

The outer end of the axle is provided with an annular groove or recess, *m*, (shown clearly in Fig. II,) and a key, *k*, made forked and of sufficient width to extend from one side of the box to the other, is inserted into the box between the ribs *l* and *l'*, and astride the axle in the groove *m*.

The step M' is made upon the lower part of the box A, on each side, which supports the springs O' and the strap M, resting thereon, and two jaws, P, extend down from the strap M, one jaw on each side of the box A, with a bumper-spring, O'', over the box, to break the force of any extraordinary jar of the wheels.

The holes through the step through which the bolts *g* extend, to hold the springs and strap thereto, are made elongated in the same direction as the length of the box A, so that as the car is swayed from one side to the other from any cause the springs and strap M may have a limited amount of side motion.

The springs O are secured to the strap M in any desired manner, and extend down and inward quite near to the housing B, so that as the car and strap M, which is firmly secured to the car, are inclined to sway to and fro from side to side, the springs O will operate to ease and somewhat limit such side motion of the car.

When the device is to be set up for use the proper quantity of packing E is first placed inside the annular flange G and the washer *a* placed upon the axle A'. The latter is then inserted through the sleeve F and the second washer, *c*, placed upon the axle, and the brass H is then held inside the box, with the spherical part H' in the recess I in the upper part of the box. The axle is then inserted into the box, with the washer *a* and the packing E pressed firmly against the end of the sleeve F, the holder K, with the material L placed therein, having been first placed in the opening *h* through the partition *d*, in the position shown in Figs. II and III. The key *k* is then inserted between the ribs *l* and *l'*, pushed down astride the axle in the groove *m*, as shown in Figs. I and II. The reservoir D' is then filled, or nearly filled, with oil, and the cover N is then secured in place by the ordinary bolts and nuts, N'. As the car is used the material L, upon which the axle presses or bears, absorbs a sufficient portion of the oil from the reservoir D' and deposits it upon the axle as it is needed and used, the holder by its elastic ears K always keeping the material L pressed up against the axle and keeping them in constant contact.

It will be seen that the brass H, having a bearing against the upper part of the box, inside only at the spherical part H', is free to move in any direction, and its hollow part, against which the axle has its bearing, is always parallel with the axle, and is in contact with the axle, and wears equally its whole length. The lugs *n* also operate to prevent the axle from moving away from its bearing in the brass and prevent rattling, keeping the parts close together and in proper position.

It will be seen that, although the jaws P extend down on each side of the box A, they are both independent of the box, as the latter has a longitudinal movement between the jaws whenever the car is inclined to sway from one side to the other. This is an important feature of my invention, as the car is made to ride much easier and with much less wear between the frictional parts.

The bumper-spring O'', aside from its usefulness in obviating the jar in running over obstructions, is also intended to take a bearing on the top of the box A when the car is too heavily loaded, and thereby prevent the springs O' from being permanently injured.

Having thus described my invention, what I claim as new is—

1. A car-axle box having a metallic housing made on the inner end thereof, and an inclosed annular sleeve surrounding the axle, with a space between to inclose a suitable wood blocking, and packing to assist in excluding the dust from the axle-bearing, substantially as described.

2. A car-axle box having an annular sleeve made on its inner end to encircle the axle, and also an outer flange or housing surrounding said sleeve, with a space between said housing and sleeve to receive a projecting annular flange made on the side of the car-wheel, substantially as described.

3. In a car-axle box, a metallic oil-pad holder provided with elastic supporting-ears, for the purpose of keeping the oil-distributing material always in contact with the journal, substantially as described.

4. In a car-axle box, the combination of the washers, as *a* and *c*, the packing, as E, and the annular sleeve, as F, for the purpose of preventing the oil from getting out of the box and the dust from getting in, substantially as set forth.

SUMNER A. BEMIS.

Witnesses:
T. A. CURTIS,
W. D. TAYLOR.